Feb. 20, 1962 D. ALPER 3,022,459
PHASING APPARATUS
Filed Nov. 5, 1956 3 Sheets-Sheet 1
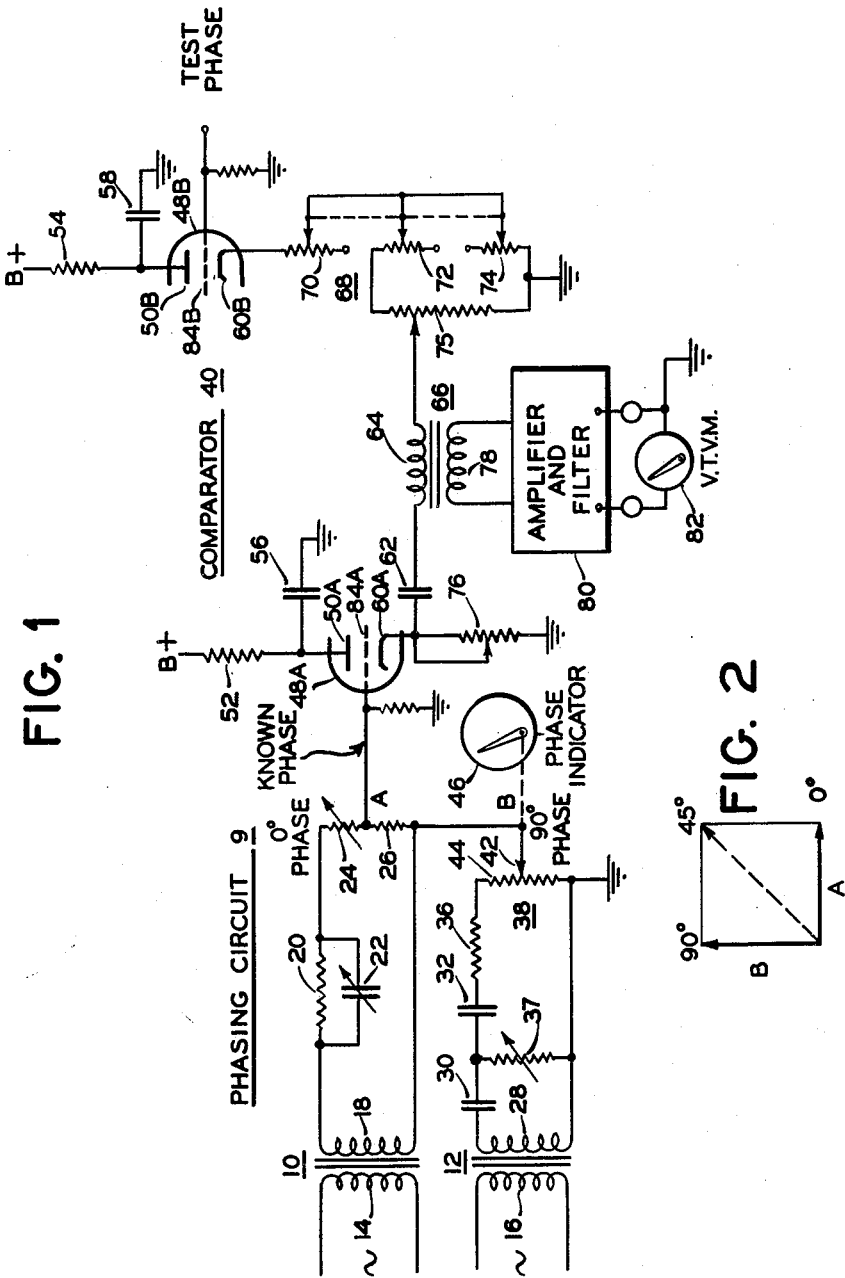
INVENTOR.
DAVID ALPER
BY
ATTORNEY

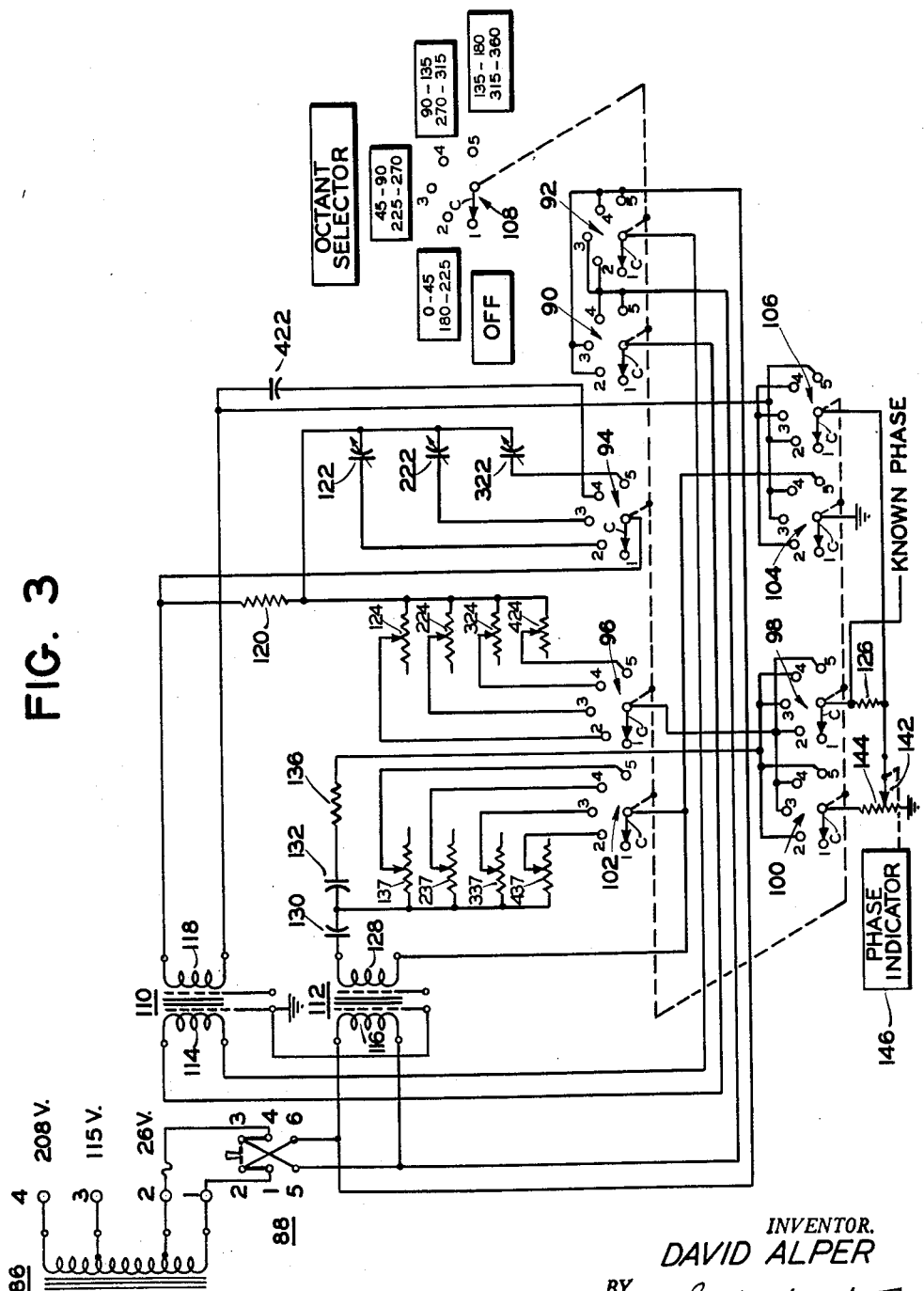

Feb. 20, 1962          D. ALPER          3,022,459

PHASING APPARATUS

Filed Nov. 5, 1956          3 Sheets-Sheet 3

0°– 45°
B – VARIABLE

45°– 90°
A – VARIABLE

90°– 135°
A – VARIABLE

135°– 180°
B – VARIABLE

180°– 225°
B – VARIABLE

225°– 270°
A – VARIABLE

270°– 315°
A – VARIABLE

B – VARIABLE
315°– 360°

INVENTOR.
DAVID ALPER
BY
*J. H. Hartz*
ATTORNEY

United States Patent Office 3,022,459
Patented Feb. 20, 1962

3,022,459
PHASING APPARATUS
David Alper, Fair Lawn, N.J., assignor to The Bendix Corporation, a corporation of Delaware
Filed Nov. 5, 1956, Ser. No. 620,259
15 Claims. (Cl. 324—83)

The invention relates to electrical apparatus and more particularly to phasing devices.

One object of the present invention is to provide apparatus which accurately indicates directly the phase angle of a voltage of unknown phase.

Another object is to provide apparatus which provides voltages of any desired phase angle from 0° to 360°.

Another object is to provide apparatus with a high input impedance using the null method to measure phase angles and which is insensitive to wave form.

Another object is to provide apparatus which is highly stable and accurate and provide for indications with high resolution.

The invention contemplates a device for providing signals of desired phase and for determining the phase angle of a test signal. The phasing circuit apparatus is adapted to provide a pair of reference voltages in quadrature with one another and combines the voltages to provide a reference signal. The amplitude of one reference voltage is varied relative to the amplitude of the other reference voltage to change the phase of the reference signal. The reference signal and the test signal are applied to a comparator, and an indicator indicates the phase angle of the signals when they are equalized.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings:

FIG. 1 is a schematic wiring diagram of a phasing device constructed according to the invention.

FIG. 2 is a diagram showing the manner of providing voltages of any desired phase within a range of 45° from a pair of voltages in quadrature, and FIG. 3 is a schematic wiring diagram showing in more detail the phase circuit of FIG. 1 to provide signals from zero to 360 degrees.

Figure 4:
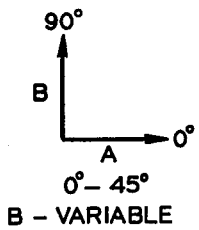
FIGS. 4 to 11 are diagrams showing the manner of providing voltages of any desired phase from 0 to 360° from a pair of voltages in quadrature with one another.

Referring now to the drawings for a more detailed description of the novel phasing device of the present invention, the device shown in FIG. 1 comprises phasing circuits 9 having a pair of isolation transformers 10, 12 with primary windings 14, 16 energized by alternating current from any suitable source. Secondary winding 18 of transformer 10 is connected through fixed resistor 20 and variable condenser 22 in parallel and variable resistor 24 to fixed resistor 26. The purpose of resistors 20 and 24 is to adjust the amplitude of the voltage across resistor 26 to a suitable value. The purpose of condenser 22 is to trim the phase of the voltage appearing across resistor 26. With this arrangement, a first reference voltage A of fixed phase and amplitude appears at resistor 26.

Secondary winding 28 of transformer 12 is connected to a 90 degree phase shifting circuit, including condensers 30, 32, fixed resistor 36, variable resistor 37 and potentiometer 38. A second reference voltage B having a fixed phase 90 degrees out of phase with reference voltage A and of variable amplitude appears at potentiometer 38.

Reference voltages A and B are combined vectorially, as shown in FIG. 2, to provide a reference signal which is applied to comparator 40 for comparison with a test signal of unknown phase. The reference signal may be adjusted within a phase angle of 45 degrees by changing the amplitude of reference voltage B by moving contact 42 across resistor 44 of potentiometer 38. It is apparent that when the amplitude of reference voltage B is zero the reference signal will have a predetermined phase angle and when the amplitudes of reference voltages A and B are equal the reference signal will have a phase angle 45 degrees therefrom as shown by the dotted line in FIG. 2. Reference signals within this range are produced by varying the amplitude of reference voltage B on potentiometer 38 from zero to the same amplitude as reference voltage A. The phase angle may be directly indicated on phase indicator 46 operated by movable contact 42 of potentiometer 38.

Comparator 40 includes a dual triode having sections 48A, 48B functioning as cathode followers. Plates 50A, 50B of sections 48A, 48B are connected to B+ voltage through decoupling resistors 52, 54 and to ground through filter condensers 56, 58 in the usual manner. Cathodes 60A, 60B of sections 48A, 48B are connected together through a D.C. blocking condenser 62, primary winding 64 of a transformer 66, a potentiometer 75 and a T pad 68. T pad 68 comprises variable resistors 70, 72, 74 terminating in potentiometer 75 and the T pad and potentiometer connect cathode 60B to ground. The T pad is provided to change the amplitude signals applied to transformer winding 64 from section 48B of the dual triode without shifting the phase of the signal or changing the bias on section 48B. Cathode 60A of section 48A is connected to ground through cathode variable bias resistor 76, the latter being used to initially balance the gains of sections 48A and 48B of the dual triode. The differential output of the cathode followers is applied through secondary winding 78 of transformer 66 through an amplifier and filter 80 to a vacuum tube voltmeter 82.

A reference signal of known phase from phasing circuits 9 is applied to grid 84A of section 48A and a test signal, whose phase angle is to be determined, is applied to grid 84B of section 48B. Potentiometer 38 is adjusted to vary the amplitude of reference voltage B until the reference signal is in phase with the test signal. Also T pad 68 is adjusted to vary the amplitude of the test signal at the output of cathode follower 48B until its amplitude is the same as the amplitude of the reference signal. T pad 68 provides a coarse adjustment of test signal amplitude and potentiometer 75 provides a fine adjustment of the test signal amplitude applied to transformer 66. When the phase of the reference signal is the same as the phase of the test signal and when the amplitude of the test signal applied to transformer 66 is the same as the amplitude of the reference signal applied to transformer 66, the vacuum tube voltmeter will read minimum or zero and the phase angle of the test signal may be read directly on indicator 46.

The arrangement described provides reference signals in a range of 45 degrees. However, it is desirable that reference signals from zero to 360 degrees be available and a switching arrangement shown in FIG. 3 is provided to change the octant of the reference signals as shown in FIGS. 4 to 11.

In FIG. 3 a zero phase shift autotransformer 86 is connected to an alternating current source of fixed frequency and is arranged for energizing the phasing circuits by alternating current voltages of various amplitudes. The autotransformer is connected through a double-throw double-pole switch 88 to primary winding 116 of transformer 112 and through switch 88 and ganged rotary switches 90, 92 to primary winding 114 of transformer 110. Double-throw double-pole switch 88 simultaneously reverses the phase of the voltage applied to both transformers 110, 112 and ganged rotary switches 90, 92 reverse the phase of the voltage applied to transformer 110 relative to the phase of the voltage applied to transformer 112. With this arrangement the voltages impressed on transformers 110, 112 may be in phase or 180 degrees out of phase with one another for the purpose described hereinafter.

Resistor 120 is connected in parallel with one condenser 122, 222 or 322, through rotary switch 94 in position 2, 3 or 5 respectively as determined by the position of switch 94. In position 4 rotary switch 94 connects condenser 422 in parallel with secondary winding 118. Secondary winding 118 of transformer 110 is connected through resistor 120 and one of these condensers to one of the resistors 124, 224, 324 or 424 through rotary switch 96 as determined by the position of switch 96. This circuit arrangement is connected to fixed resistor 126 or potentiometer 144 through rotary switches 98, 100, 104, 106 as determined by the positions of these rotary switches.

Secondary winding 128 of transformer 112 is connected through condenser 130 to one of variable resistors 137, 237, 337 or 437 by rotary switch 102 as determined by the position of the rotary switch. Secondary winding 128 of transformer 112 and condenser 130 are further connected through condenser 132 and fixed resistor 136 to fixed resistor 126 or potentiometer 144 by rotary switches 98, 100, 104, 106 as determined by the positions of these rotary switches. Rotary switches 98, 100, 104, and 106, as well as rotary switches 90, 92, 94, 96 and 102 are ganged together and are rotated by manually operated octant selector 108. With the switching arrangement described, various combinations of resistance and capacitance may be connected to the secondary windings of transformers 110 and 112 to generate reference voltages A and B across resistor 126 and potentiometer 144 with known phase angles always 90 degrees apart. Also fixed resistor 126 is connected to one or the other of the transformer circuits, and potentiometer 144 is connected to the other transformer circuit so that only one of the reference voltages can be varied in amplitude to provide a reference signal of known phase which is indicated on phase indicator 146 drivably connected to movable contact 142 of potentiometer 144.

Figure 5:
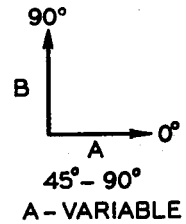
Figure 6:
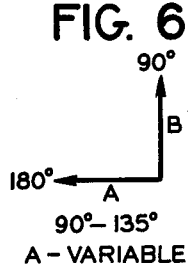
Figure 7:
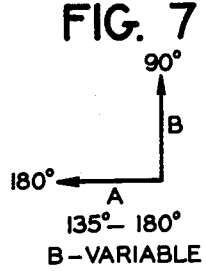
Figure 8:
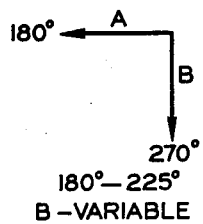
Figure 9:
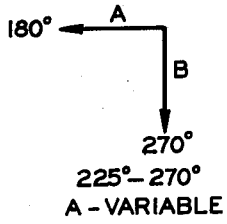
Figure 10:
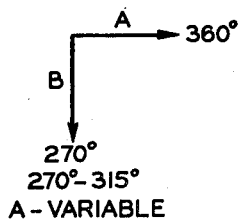
Figure 11:
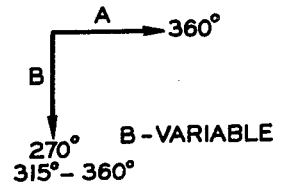

The switching arrangement including rotary switches 90, 92, 94, 96, 98, 100, 102, 104, 106 provides for shifting the reference signal to a desired octant. Each rotary switch has five fixed contacts numbered 1 to 5 and a movable contact C. As indicated above, movable contacts C are ganged together and are drivably connected to an octant selector provided with an indicator C' arranged to move through five positions numbered 1 to 5 corresponding to fixed contacts 1 to 5 of the switches. When the octant selector is in the first position, as indicated in FIG. 3, the movable contacts C of the rotary switches are in corresponding position and the phase shifter is off. When the octant selector is moved to the second position the reference signal may be varied from zero to 45 degrees as shown in FIG. 4 with the reversible switch 88 in the position shown. When switch 88 is reversed then the reference signal may be varied between 180 and 225 degrees as shown in FIG. 8. When the octant selector is in position 3 and reversible switch 88 is in the position shown in the drawing, then the reference signal may be varied between 45 and 90 degrees as shown in FIG. 5. When switch 88 is reversed then the reference signal may be varied between 225 and 270 degrees as shown in FIG. 9. Likewise when the octant selector is in the fourth position and reversible switch 88 is in the position shown in FIG. 3 then the reference signal may be varied between 90 and 135 degrees as shown in FIG. 6. When switch 88 is reversed then the reference signal may be varied between 270 and 315 degrees as shown in FIG. 10. With the octant selector in fifth position and reversible switch 88 in the position shown in FIG. 3 the reference signal may be varied between 135 and 180 degrees as shown in FIG. 7, and with switch 88 reversed the reference signal may be varied between 315 and 360 degrees as shown in FIG. 11.

It will be observed that when switches 98, 100, 104, 106 are in the second and fifth positions potentiometer 144 is connected to the circuit including transformer 112 and fixed resistor 126 is connected to the circuit including transformer 110. Under these circumstances the amplitude of the reference voltage B from the circuit including transformer 112 may be varied and the amplitude of reference voltage A from the circuit including transformer 110 is fixed. When switches 98, 100, 104, 106 are in the third and fourth positions potentiometer 144 is connected to the circuit including transformer 110 and fixed resistor 126 is connected to the circuit including transformer 112.

Under these circumstances the amplitude of reference voltage A from the circuit including transformer 110 may be varied and the amplitude of reference voltage B from the circuit including transformer 112 is fixed. The reference signal from the phasing circuit of FIG. 3 may be applied to comparator 40 at grid 84A of section 48A of the dual triode of the cathode follower circuit as shown in FIG. 1.

The apparatus described provides reference signals of any desired phase from zero to 360 degrees. The signals are stable and the phase can be repeated accurately. The apparatus accurately indicates directly the phase angle of an unknown voltage and uses the null method of measurement in comparing phase angles. The apparatus has a high input impedance and is insensitive to wave form.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A device for providing signals of desired phase, comprising a first phasing circuit adapted to be connected to an alternating current source and providing voltages of a predetermined phase, a second phasing circuit adapted to be connected to the alternating current source and providing voltages in quadrature with the first voltages, means for combining said voltages to provide a signal, means for changing the amplitude of only one of the voltages relative to the other to provide signals having phase angles variable within a 45 degree range from a reference, and indicating means operable by the amplitude changing means for indicating directly the phase angle of the signal relative to the reference.

2. A device for providing signals of desired phase, comprising a first phasing circuit adapted to be connected to an alternating current source and providing voltages of a predetermined phase, a second phasing circuit adapted to be connected to the alternating current source and providing voltages in quadrature with the first voltages, switching means for reversing the phase angles of the first and second voltages while maintaining the voltages in quadrature with one another, means for combining said voltages to provide a signal, and means for changing the amplitude of only one of the voltages to vary the phase of the signal relative to a reference, and indicating means operable by the amplitude changing means for indicating directly the phase angle of the signal relative to the reference.

3. A device for providing signals of desired phase, comprising a first phasing circuit adapted to be connected to an alternating current source and providing voltages of a predetermined phase, a second phasing circuit adapted to be connected to the alternating current source and providing voltages in quadrature with the first voltages, switching means for reversing the phase angles of the first and second voltages independently of one another while maintaining the voltages in quadrature with one another, means for combining the voltages to provide a signal, and means for changing the amplitude of only one of the voltages relative to the other to vary the phase of the signal relative to a reference, and indicating means operable by the amplitude changing means for indicating directly the phase angle of the signal relative to the reference.

4. A device for providing signals of desired phase, comprising a first phasing circuit adapted to be connected to an alternating current source and providing voltages of a predetermined phase, a second phasing circuit adapted to be connected to the alternating current source and providing voltages in quadrature with the first voltages, means for combining the voltages to provide a signal, means for changing the amplitude of only one of the voltages to provide signals having phase angles variable within a 45 degree range from a reference, switching means for connecting the amplitude changing means to the first or the second circuit, and indicating means operable by the amplitude changing means for indicating directly the phase angle of the signal relative to the reference.

5. A device for providing signals of desired phase, comprising a first phasing circuit adapted to be connected to an alternating current source and providing voltages of a predetermined phase, a second phasing circuit adapted to be connected to the alternating current source and providing voltages in quadrature with the first voltages, switching means for reversing the phases of the first and second voltages while maintaining the voltages in quadrature with one another, means for combining the voltages to provide a signal, means for changing the amplitude of only one of the voltages to vary the phase of the signal relative to a reference, and indicating means operable by the amplitude changing means for indicating directly the phase angle of the signal relative to the reference, and switching means for connecting the amplitude changing means to the first or the second circuit.

6. A device for providing signals of desired phase, comprising a first phasing circuit adapted to be connected to an alternating current source and providing voltages of a predetermined phase, a second phasing circuit adapted to be connected to the alternating current source and providing voltages in quadrature with the first voltages, means for combining the voltages to provide a signal, means for changing the amplitude of only one of the voltages to vary the phase of the signal, an octant selector including switching means for reversing the phases of the first and second voltages while maintaining the voltages in quadrature with one another and for connecting the amplitude changing means to the first or the second circuit, said octant selector and said amplitude changing means cooperating to provide signals with a phase angle variable from zero to 360 degrees from a reference, and indicating means operable by the amplitude changing means for indicating directly the phase angle of the signal relative to the reference.

7. A device for determining the phase angle of a test signal, comprising phasing circuits adapted to provide a pair of reference voltages in quadrature with one another and to combine the voltages to provide a reference signal, means for varying the amplitude of only one of the reference voltages relative to the other reference voltage to vary the phase of the reference signal, a comparator receiving and comparing the reference signal and the test signal, and means operable by the amplitude varying means for indicating directly the phase angle of the test signal when the signals are in phase with one another.

8. A device for determining the phase angle of a test signal, comprising phasing circuits adapted to provide a pair of reference voltages in quadrature with one another and to combine the voltages to provide a reference signal, means for varying the amplitude of only one of the reference voltages relative to the other reference voltage to vary the phase of the reference signal, a comparator receiving the reference signal and the test signal and having means for changing the amplitude of the test signal without shifting its phase and for comparing the reference signal and the test signal, and means operable by the reference voltage amplitude varying means to indicate directly the phase angle of the test signal upon equalizing the signals.

9. A device for determining the phase angle of a test signal, comprising phasing circuits adapted to provide a pair of reference voltages in quadrature with one another and to combine the voltages to provide a reference signal, means for varying the amplitude of only one of the reference voltages relative to the other reference voltage to vary the phase of the reference signal, a comparator receiving the reference signal and the test signal and having a T pad for changing the amplitude of the test signal without shifting its phase and having means for comparing the phase and amplitude of the reference signal and the test signal, and means operable by the reference voltage amplitude varying means to indicate directly the phase angle of the test signal upon equalizing the signals.

10. A device for determining the phase angle of a test signal, comprising phasing circuits adapted to provide a pair of reference voltages in quadrature with one another and to combine the voltages to provide a reference signal, means for varying the amplitude of only one of the reference voltages relative to the other reference voltage to vary the phase of the reference signal, a comparator having a pair of cathode followers for receiving the reference signal and test signal and having means for changing the amplitude of the test signal without shifting its phase, means connecting the cathodes of the cathode followers for comparing the phase and amplitude of the reference signal and the test signal, and means operable by the reference voltage amplitude varying means to indicate directly the phase angle of the test signal upon equalizing the signals.

11. A device for determining the phase angle of a test signal, comprising phasing circuits adapted to provide a pair of reference voltages in quadrature with one another and to combine the voltages to provide a reference signal, means for varying the amplitude of only one of the reference voltages relative to the other reference voltage to vary the phase of the reference signal, a comparator having a pair of cathode followers for receiving the reference signal and test signal and having a T pad in the cathode follower circuit receiving the test signal for changing the amplitude of the test signal without shifting its phase, means connecting the cathodes of the cathode followers for comparing the phase and amplitude of the reference signal and the test signal, and means operable by the reference voltage amplitude varying means to indicate directly the phase angle of the test signal upon equalizing the signals.

12. A device for determining the phase angle of a test signal, comprising a first phasing circuit adapted to be connected to an alternating current source and providing voltages of a predetermined phase, a second phasing circuit adapted to be connected to the alternating current source and providing voltages in quadrature with the first voltages, switching means for reversing the phase angles of the first and second voltages while maintaining the voltages in quadrature with one another, means for combining said voltages to provide a reference signal, means for changing the amplitude of only one of the voltages to vary the phase angle of the reference signal, a comparator receiving and comparing the reference signal and the test signal, and means operable by the amplitude varying means for indicating directly the phase angle of the test signal when the signals are in phase with one another.

13. A device for determining the phase angle of a test signal, comprising a first phasing circuit adapted to be connected to an alternating current source and providing voltages of predetermined phase, a second phasing circuit adapted to be connected to the alternating current source and providing voltages in quadrature with the first voltages, switching means for reversing the phase angles of the first and second voltages independently of one another while maintaining the voltages in quadrature with one another, means for combining the voltages to provide a reference signal, means for changing the amplitude of only one of the voltages relative to the other to vary the phase angle of the reference signal, a comparator receiving the reference signal and the test signal and having a pair of cathode followers for receiving the reference signal and test signal and having means for changing the amplitude of the test signal without shifting its phase, means for comparing the phase and amplitude of the reference signal and the test signal, and means operable by the voltage amplitude changing means to indicate directly the phase angle of the test signal upon equalizing the signals.

14. A device for determining the phase angle of a test signal, comprising a first phasing circuit adapted to be connected to an alternating current source and providing voltages of a predetermined phase, a second phasing circuit adapted to be connected to the alternating current source and providing voltages in quadrature with the first voltages, means for combining the voltages to provide a signal, means for changing the amplitude of only one of the voltages to vary the phase of the signal, an octant selector including switching means for reversing the phases of the first and second voltages while maintaining the voltages in quadrature with one another and for connecting the amplitude changing means to the first or the second circuit, said octant selector and said amplitude changing means cooperating to provide signals with phase angles variable from zero to 360 degrees, a comparator receiving and comparing the reference signal and the test signal, and means operable by the voltage amplitude changing means for indicating directly the phase angle of the test signal when the signals are in phase with one another.

15. A device for determining the phase angle of a test signal, comprising a first phasing circuit adapted to be connected to an alternating current source and providing voltages of a predetermined phase, a second phasing circuit adapted to be connected to the alternating current source and providing voltages in quadrature with the first voltages, means for combining the voltages to provide a signal, means for changing the amplitude of only one of the voltages to vary the phase of the signal, an octant selector including switching means for reversing the phases of the first and second voltages while maintaining the voltages in quadrature with one another, and for connecting the amplitude changing means to the first or the second circuit, said octant selector and said amplitude changing means cooperating to provide signals with phase angles variable from zero to 360 degrees, a comparator having a pair of cathode followers for receiving the reference signal and the test signal, a T pad in the cathode follower circuit receiving the test signal for changing the amplitude of the test signal without shifting its phase, means connecting the cathodes of the cathode followers for comparing the phase and amplitude of the reference signal and the test signal, and means operable by the voltage amplitude changing means to indicate directly the phase angle of the test signal upon equalizing the signals.

References Cited in the file of this patent

UNITED STATES PATENTS

| | | |
|---|---|---|
| 1,495,466 | Wente | May 27, 1924 |
| 2,408,193 | Beste | Sept. 24, 1946 |
| 2,414,475 | Marchand | Jan. 21, 1947 |
| 2,471,105 | Gustafsson et al. | May 24, 1949 |
| 2,481,492 | Bjarnason | Sept. 13, 1949 |
| 2,532,368 | Malmquist | Dec. 5, 1950 |
| 2,606,966 | Pawley | Aug. 12, 1952 |
| 2,672,588 | Vanous | Mar. 16, 1954 |
| 2,684,443 | Tidball | July 20, 1954 |
| 2,751,555 | Kirkpatrick | June 19, 1956 |
| 2,762,012 | Kaltenbacher | Sept. 4, 1956 |
| 2,794,948 | Thompson et al. | June 4, 1957 |
| 2,857,568 | Hering | Oct. 21, 1958 |
| 2,863,117 | Graustein | Dec. 2, 1958 |
| 2,911,592 | Colker et al. | Nov. 3, 1959 |

FOREIGN PATENTS

| | | |
|---|---|---|
| 617,568 | Germany | Aug. 23, 1935 |

OTHER REFERENCES

"Direct Reading Phasemeter," article in The Review of Scientific Instruments, April 1950; pp. 271–273.

"A Simple Variable Frequency Phase Measuring Device," article in Electronic Engineering, September 1952; pp. 402, 403.